US009225403B2

(12) United States Patent
McWilliams et al.

(10) Patent No.: US 9,225,403 B2
(45) Date of Patent: Dec. 29, 2015

(54) METHOD AND SYSTEM FOR ENHANCED TRANSMISSION IN MOBILE COMMUNICATION NETWORKS

(71) Applicant: Vodafone IP Licensing Limited, Newbury, Berkshire (GB)

(72) Inventors: Brendan McWilliams, Newbury (GB); Yannick Le Pezennec, Newbury (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 241 days.

(21) Appl. No.: 13/850,855

(22) Filed: Mar. 26, 2013

(65) Prior Publication Data
US 2013/0250789 A1    Sep. 26, 2013

(30) Foreign Application Priority Data
Mar. 26, 2012  (ES) .................................. 201230445

(51) Int. Cl.
| | | |
|---|---|---|
| *H04W 4/00* | (2009.01) | |
| *H04B 7/04* | (2006.01) | |
| *H04B 7/02* | (2006.01) | |
| *H04B 7/06* | (2006.01) | |

(52) U.S. Cl.
CPC ............ *H04B 7/0456* (2013.01); *H04B 7/0417* (2013.01); *H04B 7/0473* (2013.01); *H04B 7/0465* (2013.01); *H04B 7/0632* (2013.01); *H04B 7/0682* (2013.01)

(58) Field of Classification Search
CPC ... H04L 1/0026; H04L 5/0053; H04L 5/0055; H04L 5/001; H04L 1/1861; H04L 5/0057
USPC .................................................... 370/329, 252
See application file for complete search history.

(56) References Cited

U.S. PATENT DOCUMENTS

| | | | | |
|---|---|---|---|---|
| 5,909,384 A | * | 6/1999 | Tal et al. ........................ | 708/322 |
| 2007/0280116 A1 | * | 12/2007 | Wang et al. ..................... | 370/236 |
| 2010/0296595 A1 | * | 11/2010 | Senba ............................ | 375/260 |
| 2010/0316154 A1 | * | 12/2010 | Park et al. ...................... | 375/267 |
| 2011/0077019 A1 | * | 3/2011 | De Pasquale et al. ...... | 455/452.2 |
| 2012/0140689 A1 | * | 6/2012 | Pelletier et al. ............... | 370/311 |
| 2012/0149411 A1 | * | 6/2012 | Miyoshi et al. ............... | 455/501 |
| 2013/0100997 A1 | | 4/2013 | Wang et al. | |

FOREIGN PATENT DOCUMENTS

| | | | |
|---|---|---|---|
| CN | EP2640125 | * | 1/2011 |
| CN | 101984707 A | | 3/2011 |
| WO | WO 2009/055546 A2 | | 4/2009 |
| WO | WO 2011157229 A1 | | 1/2011 |

OTHER PUBLICATIONS

Spanish Search Report for 201230445 dated Mar. 26, 2012.
(Continued)

*Primary Examiner* — Charles C Jiang
*Assistant Examiner* — Will Lin
(74) *Attorney, Agent, or Firm* — Workman Nydegger

(57) ABSTRACT

A transmission method and system for use in a base station of a mobile communication network. It provides a simple and efficient technique which improves the performance of prior art solutions for MIMO user equipments (especially in bad or medium radio conditions scenarios).

17 Claims, 3 Drawing Sheets

(56) References Cited

OTHER PUBLICATIONS

3rd Generation Partnership Project; Technical Specification Universal Mobile Telecommunications System (UMTS);Physical layer Procedures (FDD) (3GPP TS 25.214 version 9.8.0 Release 9); 3rd Generation Partnership Project (3GPP), Mobile Competence Centre ; 650, route des Lucioles; F-06921 Sophia-Antipolis Cedex ; France. Mar. 13, 2012. Epigrafes 6A.4 y 9.

European Search Report for EP13 16 0947 dated Oct. 29, 2015.

* cited by examiner

METHOD AND SYSTEM FOR ENHANCED TRANSMISSION IN MOBILE COMMUNICATION NETWORKS

CROSS REFERENCE TO RELATED APPLICATIONS

This application claims priority to Spanish Application Number P201230445, filed on Mar. 26, 2012, the entirety of which is incorporated herein by reference.

FIELD OF THE INVENTION

The present invention relates to wireless communications and more specifically to an enhanced transmission system and method for mobile communication networks.

BACKGROUND OF THE INVENTION

The enhanced transmission method and system proposed in the present invention, it is especially useful in 3GPP mobile networks but it could be used also in networks using any wireless transmission technology including: networks using 2G radio access technology (GSM, GPRS, EDGE etc.), 3G Technology (UMTS, HSDPA, HSUPA, etc.), 4G LTE (Long Term Evolution), as well as WIMAX.

A technique frequently used to improve the performance of, for example, 3G wireless networks is the High-Speed Downlink Packet Access HSDPA technology. HSDPA is a packet-based data service in third generation (3G) W-CDMA (Wideband Code Division Multiple Access) systems, which provides high-speed data transmission (with different download rates e.g. 7.2/10.8/16.2/21.6/28.8/43.6 Mbps over a 5 MHz bandwidth) to support multimedia services.

HSDPA comprises various versions with different data speeds and features. In table 5.1a of the release 9 version of 3GPP TS 25.306, it is shown maximum speeds of different device classes and the combination of features they support.

In order to reach yet higher peak rates (i.e. 28.8 Mbps with 3GPP Release 7 and 43.6 with Release 8) the MIMO (Multiple Input Multiple Output) feature is used in HSDPA. And it is in systems using MIMO techniques where this invention is preferably going to be applied.

In MIMO systems, both the transmitter and the receiver are equipped with multiple antennas in order to improve the system performance (capacity and user throughput performance of the networks). The basic MIMO feature as standardised in 3GPP Release 7 is based on two transmitter antennas at the node B (or an analogous network entity such as an eNode B or BTS) 11, 12 and two receiving antennas (at the UE). At the transmitter, the data can be split into one or two data streams (primary transport block 13 and optionally secondary transport block 14) and transmitted through the two antennas using the same radio resource (i.e. same transmission time interval and HSDPA codes). The primary and secondary transport block can be for example HS-DSCH channels.

If only the primary transport block (13) is transmitted, it is called a single stream MIMO transmission and if both transport blocks (13, 14) are transmitted, it is called a dual stream MIMO transmission. Generally speaking the base station scheduler can decide to transmit one or two transport blocks to a UE in one TTI in the serving cell, but in some systems or scenarios the dual stream mode is not possible e.g. when users have bad radio conditions leading low Signal to Interference plus Noise Ratios and only single stream transmission is used.

A generic downlink transmitter structure to support MIMO operation is shown in FIG. 1. The primary and optionally the secondary transport blocks are each processed 15, 16 (channel coding and interleaving), then spread and scrambled (17, 18) and subsequently weighted by precoding (PCI) weights $w_1, w_2, w_3, w_4$ (called MIMO precoding weights) and added (19, 20). Channel coding, interleaving and spreading are done as in non-MIMO mode. The resulting channels after MIMO precoding (i.e. MIMO channel #1 21 and MIMO channel #2 22) are mapped (23, 24) onto Primary and Secondary Common Pilot Channels (P-CPICH 25 and S-CPICH 26) respectively before being fed to the first and second physical antennas respectively. The two streams of data are recovered by the UE from the signals received via its two Rx antennas.

Thus, for the MIMO feature to work both the network and the terminals need to be MIMO-enabled. In order to deploy MIMO and transmit two parallel data streams, two power amplifiers are required per sector (one for each of the two antennas). In order not to use an entire carrier for MIMO only (5 MHz), it is more efficient and practical to use the same carrier for MIMO devices as used for non-MIMO devices (e.g. HSDPA legacy terminals).

If the Node B schedules a single transport block (single stream transmission, i.e. the secondary transport block is not transmitted) in a cell to a UE in one TTI (transmission time interval), it uses only the precoding vector ($w_1, w_2$) for transmission of that transport block through the two branches (this can be done by making the precoding weights $w_3=w_4=0$). If the Node B schedules both transport blocks in a cell to a UE in one TTI, it may use two orthogonal precoding vectors ($w_1, w_2$) and ($w_3, w_4$), to transmit the two transport blocks. The precoding vector ($w_1, w_2$) is called the primary precoding vector which is used for transmitting the primary transport block and the precoding vector ($w_3, w_4$) is called secondary precoding vector which is used for transmitting the secondary transport block, respectively.

In FIG. 1, it is supposed that both single stream and dual stream mode are allowed. If only a single stream mode is allowed in said base station, the structure will be the same but blocks corresponding to the secondary transport block (14, 16, 18 and precoding weights $w_3, w_4$) would not exist.

In an exemplary embodiment, the precoding weights $w_1$ and $w_3$ are constant real valued scalars and the precoding weights $w_2$ and $w_4$ are variable complex valued scalars. The pre-coding weights are used as part of the MIMO transmission chain defined in 3GPP (see TS 25.214) and they are selected for each specific transmission (that is, for each MIMO user equipment) by the node B. The weights selected may be signaled by the node B to the UE during the transmission. In an exemplary embodiment, the UE (user equipment) determines a preferred value of the precoding weights and send them to the node B (said information is called Precoding Weight Indication PCI), together with channel quality indication (CQI). Based on said PCI and CQI reports, the Node B decides for example: whether to schedule one or two transport blocks (i.e single stream or dual stream transmission), whether to use the preferred values sent by the UE for the precoding weights or not, what transport block size and modulation scheme to use . . . . Generally speaking, the defined weights are selected by the Node B, for example every TTI (e.g 2 ms) to optimize the transmission (for example, selecting the weights which enables the highest throughput to be transmitted for a given BLER (Blocked Error Rate) target) and they are usually selected for each MIMO user (that is, for each MIMO user equipment) taking into account information in the uplink messages of said MIMO user equipment (even said precoding weights could be selected by the MIMO user equipment as stated before).

When introducing MIMO in a system, it is indispensable to have two transmission branches (RF chains), maybe including two power amplifiers (140, 190) each one connected to the physical antenna. In order to optimise the usage of the power resource it is highly desirable to balance the power between the two power amplifiers. Whilst MIMO channels are intrinsically perfectly power balanced, all the remaining channels need to be transmitted with equal power by each power amplifier. To this end, two techniques can be used: a first one is the use of transmission diversity (using "Space Time Transmit Diversity" (STTD) for all non-MIMO channels except for the Synchronisation Channel for which "Time Switch Transmit Diversity" (TSTD) is used). Another technique is referred to as Virtual Antenna Mapping (VAM) in this description, and is discussed herein after.

Virtual Antenna Mapping is an alternative which is aimed at solving this issue fulfilling above-mentioned requirements. Hence, this technique enables power balancing of the power amplifiers whilst not impacting on the performance of legacy user equipments. The principle of the VAM technique is depicted in FIG. 2. The VAM operation/function 100 can be performed as a baseband function after the mapping onto physical channels for Rel'99 and HSDPA (in case of SIMO operation) and after precoding for MIMO. The VAM operation/function can also be implemented in logic in a radio unit such as a Remote Radio Head (RRH). The signals 151, 152 shown at the input of adding operations 150 and 180 are, for example, the resulting channels after MIMO precoding (i.e. MIMO channel #1 21 and MIMO channel #2 22) as explained before and shown in FIG. 1. These signals are mapped (150, 180)) onto Primary and Secondary Common Pilot Channels (P-CPICH 153 and S-CPICH 154) (in case of non-MIMO operation, only one signal 151 will be used and it will be mapped onto a Primary Common Pilot Channel). VAM consists of mapping input signals onto the physical antennas with specific weights for each path. VAM can be seen as a matrix of four weights $p_1, p_2, p_3, p_4$ and two adders 110 applied to two input signals fed by "virtual antennas" 160, 170 corresponding to the physical antennas of the MIMO operation. The VAM weights fulfill totally different objectives than the MIMO precoding weights. These VAM weights are fixed at cell level (typically same VAM weights are used in all cells of a network) objective to fulfill the requirements highlighted above and are applied to all physical channels of the cell (contrary to MIMO weights, which are selected (e.g. every every 2 ms), for each MIMO user equipment and apply to physical channels of the specific MIMO user equipment).

The force of the virtual antenna concept is that the UE behaves as if the signals present at the virtual antennas are the ones actually transmitted, although the physical antennas (120, 130) radiate something different. As stated before, the legacy UE (not supporting MIMO) will only use the virtual antenna 160. Whilst its signal will be transmitted on both physical antennas the UE receiver will act as if transmitted from one (the mapping between virtual and physical antennas is transparent for the user equipment). The configuration received by the legacy user equipment is the same as in a single antenna transmission system, the user equipment is not configured for any form of transmit diversity at RRC level. The MIMO UE will use both virtual antenna 160 and virtual antenna 170 and is unaware of the mapping between the virtual and physical antennas, which is transparent to the MIMO operation.

The four weights from the VAM matrix are differentiated by phases only as equal amplitude is required to achieve power balancing between the two physical antennas 120,130. A first power amplifier 140 and a second power amplifier 190 are configured for amplifying the output signals after the VAM function before they are radiated by the physical antennas 120,130. A pure SIMO mode can be also seen as a particular case of the VAM application, where the same signal from the primary virtual antenna is mapped on the two antennas but with a given phase offset (it is like the second virtual antenna has zero values in the matrix, $p_3=p_4=0$). From the legacy user equipment (non-MIMO) point of view the VAM technique is like a single antenna transmission, i.e. the user equipment demodulates the HSDPA signal as if there were no Transmission diversity in the system. Seen from the transmit side for legacy non-MIMO user equipments, VAM amounts to transmitting the same signal (common channel, Rel'99 and HSDPA non-MIMO) on the two transmit antenna ports but with a different phase (different weights $p_1$ and $p_2$).

However, from extensive field testing of VAM functionality (measurements over a large amount of static points which statistically shows the impact of VAM), it is shown that even though the VAM technique has a better performance than previously used techniques such as STTD, it has still a negative impact in HSDPA legacy devices when there is concurrent HSDPA and MIMO traffic. This may be solved with the E-VAM technique.

The Enhanced Virtual Antenna Mapping (E-VAM as disclosed in the European Patent Application EP10382262) is a technique which solves the aforementioned problems by adding to the standard VAM technique the additional functionality whereby an additional phase offset (FIG. 3, 30) (also called adaptive or dynamic phase offset as it is changed dynamically depending in such a way to provide the best performance in the cell) is applied (FIG. 3, 29) to one of the physical paths (1 physical antenna), in order to modify and adapt the transmit polarization according.

In order to select said additional (or dynamic) phase offset, usually a phase scan is made sampling the phase range by given steps of $\Delta\theta$ degrees and measuring user equipments received quality for each phase offset. The phase offset to be applied for the cell may be selected as a function of the measured quality (e.g. cqi) reported by user equipments (FIG. 3, 31) and a given optimisation criterion. Said criterion may be to maximize the throughput of the legacy HSDPA devices especially when MIMO user equipments are active or, in other words to maximize the energy received from the HSPA serving cell by the legacy HSDPA user equipments.

The most used optimization criterion consists of selecting the Phase which maximizes equation $$\frac{1}{N} \cdot \sum_{i=1}^{N} CQI_i \cdot s_i$$

where $s_i$ is the weight associated to user equipment i, $CQI_i$ corresponds to the CQI (channel quality information) reported by user equipment i and N is the number of user equipments considered.

Instead of CQI, other alternative parameters can be used to select the phase as CPICH (Control Pilot Channel) RSCP (Received signal code Power), CPICH Ec/No, NACK info etc.

Said phase scan and phase offset selection may be is made periodically during the duration of the HSDPA session and additionally triggered when there is a new call setup or any other specific event which leads a data user to be in active mode.

E-VAM can only act on a single phase offset (cell level parameter) so it is not possible to adapt the phase offset on a user equipment basis when we have multiple user equipments, the selected phase offset is a compromise to achieve the highest capacity. Usually only quality information reported by HDSPA user equipments is taken into account for the phase selection but it is important to only take into account users which are genuinely active during the application of the phase offset. This may be done, for example, by monitoring for each connected user equipments (user equipments with an HSDPA RAB in cell_DCH state) the volume of data transmitted over a time window which can be the duration of the phase scan period (100-300 ms) or the phase application period (e.g. 1-3 sg). A threshold is then fixed to consider the user equipment as active and susceptible to benefit from E-VAM and, therefore, only these user equipments considered as active are used to calculate the phase offset.

E-VAM is applying this additional phase offset to all user equipments of the cell: MIMO and non-MIMO. However for MIMO user equipments, the E-VAM technique does not have a positive effect (maximizing the throughput). The reason is the following:

The selection of the E-VAM additional offset (scanning, measuring the quality reported by the users . . . ) takes some time, so the E-VAM additional offset are only changed every period of seconds (e.g. 1-3 s). As explained before, the transmissions to MIMO user equipments have pre-coding weights ($w_1$, $w_2$, $w_3$, $w_4$) which are changed by the node B every TTI (e.g. 2 ms), making that the weights applied to the signals transmitted to MIMO user equipments can change every TTI. Hence the E-VAM additional offset effect is somehow superseding by the MIMO precoding weights, because said MIMO weights change so fast compared to the E-VAM offset selection, that the selected phase offset is not any more the one which is optimum for the MIMO user equipments (as their signals parameters changes much faster). In other words, the E-VAM gain is not appreciated by MIMO user equipments. That's why, the MIMO user equipments are not usually taking into account for the E-VAM phase offset selection.

Extensive field testing has shown the following:

Without using E-VAM, MIMO configuration performance is much better than SIMO configuration performance in good radio conditions (40% higher throughput) and in medium radio conditions (10-20% higher throughput). In bad radio conditions, MIMO versus SIMO performance gain ranges typically from 0 to 10%.

However, when E-VAM is used, comparing the performance of MIMO user equipments vs SIMO user equipments, it has been shown that, in good radio conditions the MIMO performance is better (more than 30% higher throughput than SIMO) but, in medium and bad radio conditions, MIMO performance is worse than SIMO (10-15% less throughput with MIMO) due to the E-VAM gain in SIMO user equipments (not appreciable by the MIMO user equipments as explained before).

This problem does not appear in LTE systems, as in LTE MIMO performance is more robust and always superior to SIMO whatever the radio conditions. This is due to the fact that in LTE technology is embedded instantaneous fallback to transmit diversity which allows a good performance in medium and bad radio conditions. In 3G this is not possible, as the fast fallback is not supported and also because the transmit diversity scheme (STTD) has performance problems (incompatibility with HSDPA UE receiver equalizers).

In other words, MIMO user equipments in 3G has a significant problem of performance versus SIMO user equipments in medium and bad radio conditions (e.g. at cells edges), since MIMO performance is either low or inferior in these radio conditions according to the SIMO configuration used, when using E_VAM technique (which is more spectral efficient).

This makes it very difficult to deploy MIMO or Multi Carrier MIMO functionalities as they would all have this big disadvantage bearing in mind that medium or bad radio conditions performance (e.g. cell edge performance) is very important for an operator.

There is therefore a need in the art for transmission schemes which further improve the performance for MIMO user equipments.

SUMMARY OF THE INVENTION

The current invention solves the aforementioned problems by disclosing a transmission system and method for use in a wireless telecommunication network, which improves the performance of prior art solutions.

According to a first aspect of the invention, it is provided a method of operating a transmission system of a base station in a mobile communication network, said base station serving a first group of mobile communication network user equipments, UEs, the transmission system comprising a first transmission branch for transmitting a first radio signal by a first physical antenna and a second transmission branch for transmitting a second radio signal by a second physical antenna, where an additional phase offset is added to one of the transmission branches, said phase offset being calculated taken into account the signal quality received by a sub-group of the user equipments served by the base station;

where for the user equipments served by the base station using a Multiple Input Multiple Output MIMO functionality, called MIMO user equipments, said transmission system applies MIMO precoding weights before transmission, to the first and second radio signals, the value of said MIMO precoding weights being updated for each MIMO user equipment, every certain period of time, based on information reported by said MIMO user equipment, the method comprising the steps of:

a) determining by the base station, the signal quality received by the MIMO user equipments and b) if the signal quality received by one of said MIMO UEs is below a certain first threshold, the MIMO precoding weights for said MIMO UE are assigned a fixed value and maintained in said fixed value until a certain first criteria is fulfilled so for said MIMO UE the precoding weights are not updated every said certain period of time.

According to a second aspect of the invention, it is provided a transmission system for use in a base station of a mobile communication network said base station serving a first group of mobile communication network user equipments, the transmission system comprising:

a first transmission branch for transmitting a first radio signal by a first physical antenna and a second transmission branch for transmitting a second radio signal by a second physical antenna, means for adding an additional phase offset to one of the transmission branches of one of the physical antennas, said additional phase offset being calculated taken into account the signal quality received by some of the user equipments served by the base station means for, for the user equipments served by the base station using a Multiple Input Multiple Output MIMO functionality, called MIMO user equipments, weighting before transmission said first and second radio signals by MIMO precoding weights, said MIMO precoding weights being updated for each MIMO user equipment, every certain period of time, based on information reported by said MIMO user equipment a scheduler being configured to determine the signal quality received by the MIMO user equipments and, if the signal quality received by one of said MIMO UEs is below a certain first threshold, to assign a fixed value to the precoding weights for said MIMO UE and to maintain said fixed value for the precoding weights until a certain first criteria is fulfilled so for said MIMO UE the precoding weights are not updated every said certain period of time.

The quality received by an user may be determined based on the channel quality indication (CQI) reported by said user.

The information reported by said MIMO user equipment to update the value of the precoding weights may be a Precoding Control Indication, PCI (this information will be ignored until the first criteria is fulfilled, if the signal quality received by one of said MIMO UEs is below said certain first threshold and the precoding weights are frozen).

The base station may be a node B and the mobile communication network may be a 3G mobile communication network.

The scheduler may be a base station scheduler and specifically a node B scheduler.

In an exemplary embodiment, the transmission system additionally uses Virtual Antenna Mapping technique to balance the power between the transmission branches.

In an exemplary embodiment, said certain period of time is a Transmission Time Interval TTI, that is, the precoding weights are updated every TTI (except if the signal quality received by one of said MIMO UEs is below a certain first threshold).

In an exemplary embodiment, said first criteria is that the quality received by said MIMO user is above a certain second threshold or in an alternative embodiment said first criteria is to fulfill one of the following conditions: that the quality received by said MIMO user is above a certain second threshold or that the number of active HSDPA user equipments served by the base station is above a certain third threshold.

In an exemplary embodiment, the MIMO transmission is dual stream and the quality received by a MIMO user is determined based in the combination of the CQI reported by the MIMO user for the first stream and the CQI reported by the MIMO user for the second stream.

In an exemplary embodiment, if a dual stream MIMO transmission is being transmitted to said MIMO user whose signal quality is below the first threshold, the MIMO transmission for said MIMO user is changed to single stream until the first criteria is fulfilled.

In an exemplary embodiment, the MIMO user equipment whose signal quality is below the first threshold (so the weights are "frozen), is added to the sub-group of user equipments whose received signal quality is taken into account to calculate the additional phase offset and said MIMO user equipment is removed from said sub-group when the first criteria is fulfilled. The rest of user equipments belonging to the sub-group of user equipments whose received signal quality is taken into account to calculate the additional phase offset may be MIMO user equipments with "frozen weights" (that is, whose signal quality is below the first threshold) and non-MIMO user equipments whose volume of data transmitted over a time window is above a certain threshold In an exemplary embodiment, in order to calculate the additional phase offset the following steps are performed:

making a phase scan, sampling the phase range by given steps of $\Delta\theta$ degrees and measuring, for each phase offset, the received quality of the sub-group of user equipments;

selecting the additional phase offset to be applied for the cell as a function of the measured quality and a given optimisation criterion; and applying the selected phase offset to one of the transmission chains.

Finally, a computer program comprising computer program code means adapted to perform the above-described method is presented.

For a more complete understanding of the invention, its objects and advantages, reference may be made to the following specification and to the accompanying drawings.

BRIEF DESCRIPTION OF THE DRAWINGS

For the purpose of aiding to better understand the characteristics of the invention according to a preferred practical embodiment thereof and in order to complement this description, the following figures is attached as an integral part thereof, having an illustrative and non-limiting character.

DETAILED DESCRIPTION OF THE INVENTION

The method and system hereby described can be applied, for example, to UMTS 3G mobile networks but other types of networks and systems are not excluded. The skilled addressee will appreciate that the method and system may be adapted to networks using any wireless transmission technology including: networks using 2G radio access technology (GSM, GPRS, EDGE etc.), 3G Technology (UMTS, HSDPA, HSUPA, etc.), 4G LTE (Long Term Evolution), as well as WIMAX.

As explained before, it has been seen that MIMO scheme (especially in 3G systems) has a better performance in good radio conditions than the E-VAM technique, but it is inefficient in medium and bad radio conditions when compared with Enhanced VAM performance (which, as explained before, has no effect in user equipments using MIMO technique at the same time). Hence, a fallback to a more efficient transmission mode would be beneficial in said areas where MIMO is inefficient.

In current 3G systems, said fallback should be done using RNC signaling via a reconfiguration of the physical layer (triggered for example, via some proprietary signaling over Iub is a possible solution). However, this solution has the drawback to be slow and heavy from a signaling point of view.

The present invention solves said problem by proposing a simple and efficient method and system for use in a mobile telecommunication network, which improves the performance of prior art solutions.

Figure 1:
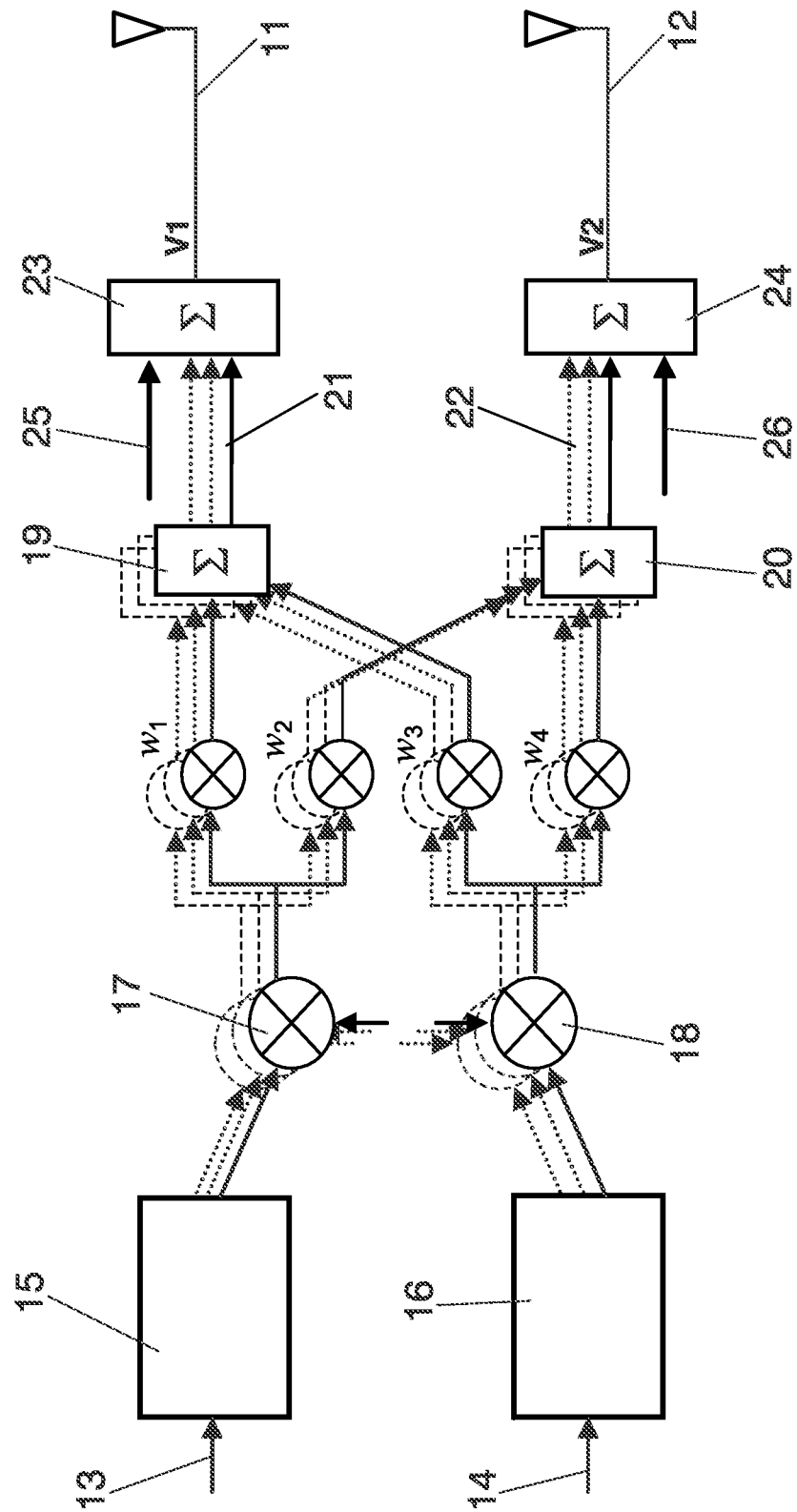
FIG. 1 shows a block diagram of a generic transmitter structure to support MIMO operation according to a prior art embodiment.
Figure 2:
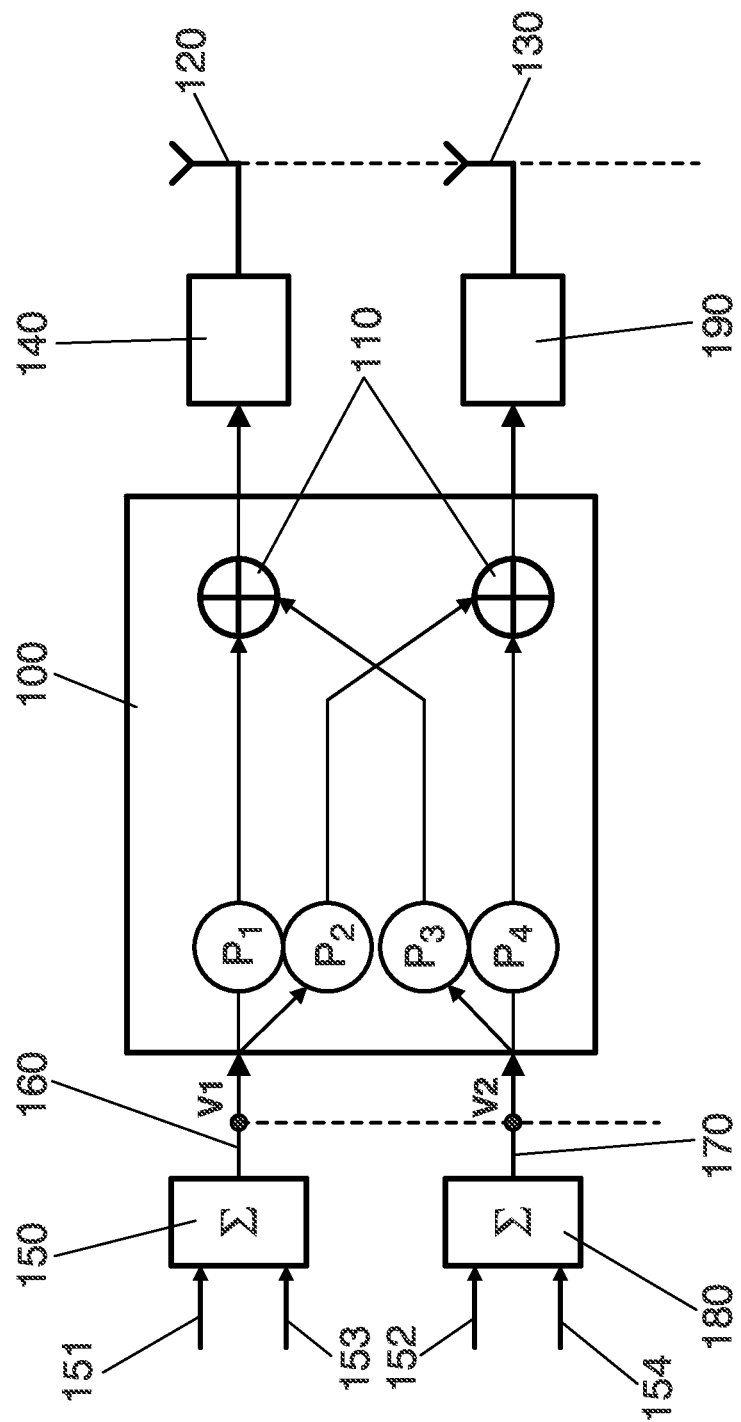
FIG. 2 shows an exemplary embodiment of the prior art VAM technique.
Figure 3:
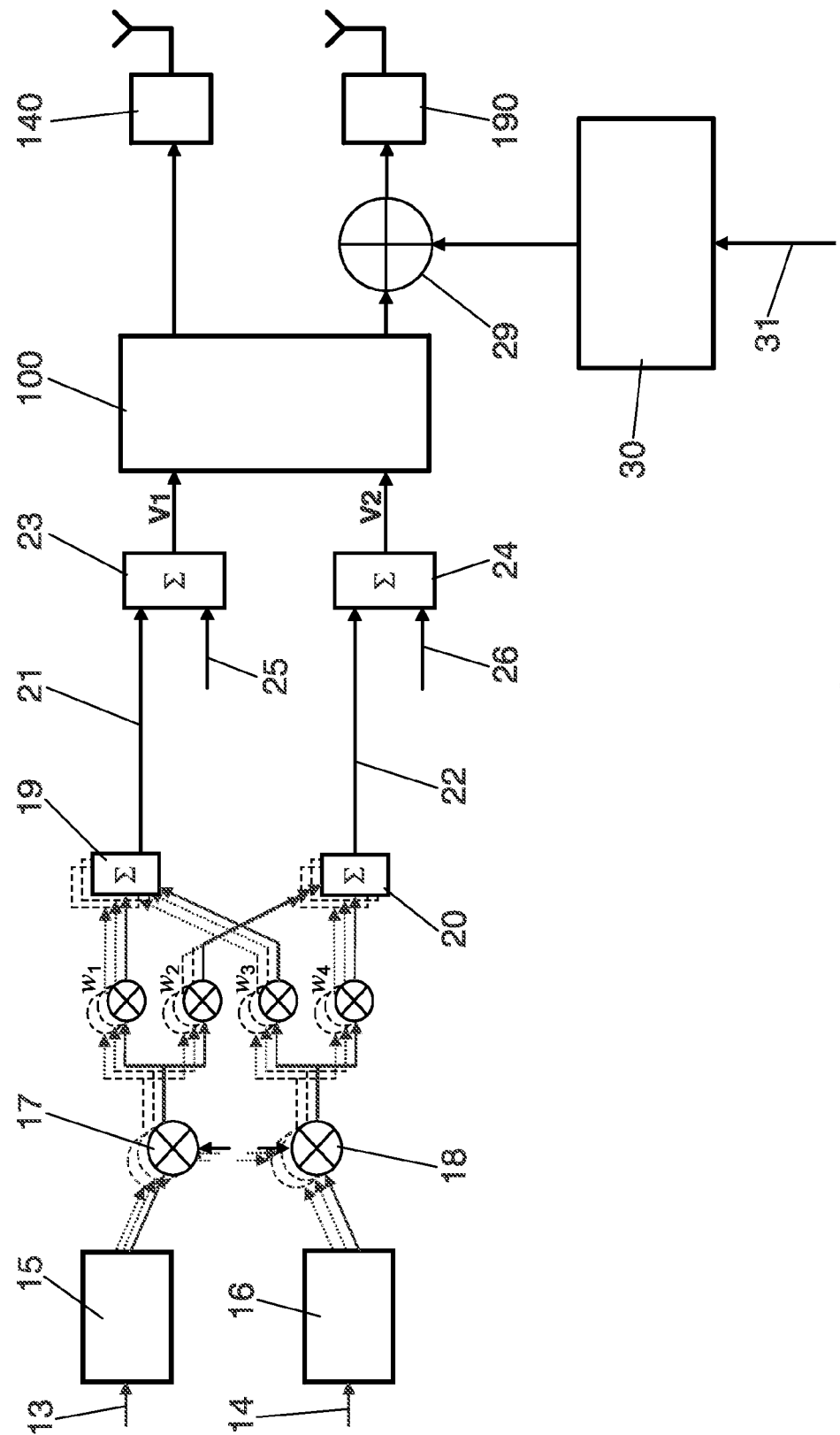
FIG. 3 shows a block diagram of a generic transmitter structure to support MIMO and E-VAM operation.

In FIG. 3, it is shown an exemplary generic downlink transmitter structure to support MIMO and E-VAM operation, where the proposed solution may be applied. The first part of this structure correspond to the MIMO operation (as disclosed in FIG. 1) and then the E-VAM technique is introduced.

For the transmission to non-MIMO user equipments, the MIMO structure (shown in FIG. 1) will not be used. In this case, only one signal (v1) will be fed to the VAM matrix (Rel'99 and/or HSDPA non-MIMO mapped on a common pilot channel) and this signal will be fed on the two transmit antenna ports but with a different phase.

In the present invention, to improve the performance of the MIMO user equipment transmission, there is a sort of fallback (switch) between MIMO and E-VAM for MIMO user equipments and this switch is made in the base station (node B or an analogous network entity such as an eNode B or BTS). This switch is made according to a certain criterion. In an exemplary embodiment, the switch is made according to the radio conditions (when the radio conditions are medium or bad), for example based on reported CQI levels.

And this is done by the present invention, maintaining the user equipment in MIMO configuration. Thereby there is no need for a change in the configuration of the user equipment which will imply a reconfiguration of the user equipment physical layer using RNC signaling which would be slow and heavy and, therefore, time consuming.

As explained before, in a cell with E-VAM operation, the E-VAM technique is applied to MIMO and non-MIMO user equipments but said E-VAM technique has no real benefit for the MIMO user equipments (actually for said reason, MIMO users are ignored by E-VAM algorithm when selecting the E-VAM additional phase offset, in order to improve the gain for non-MIMO users). The fallback or switch of a MIMO user equipment, between MIMO and E-VAM proposed by the present invention, means that the MIMO user equipments transmission is modified so the E-VAM has now effect in (is not transparent to) the MIMO user equipment.

In an embodiment of the present invention, the Node B scheduler decides the switch from MIMO to E-VAM as a function of the reported CQI level (e.g. filtered/average over a certain measurement period).

In an embodiment of the present invention, in order to perform said switch to E-VAM, the Node B freezes the MIMO precoding weights, even ignoring the predefined values of the PCI weights reported by the UE. Doing that, as the MIMO weights do not change faster than the E-VAM additional (dynamic) phase offset, then the E-VAM additional offset is not transparent anymore for the MIMO user equipments, so the E-VAM additional offset has an effect in the MIMO user equipment. In other words, the E-VAM gain is now appreciated by MIMO user equipments. For said reason E-VAM should optimise the phase offset taking into account as well the radio conditions of the MIMO user which has been switched to E-VAM, like for a normal non-MIMO HSDPA user.

In an embodiment of the present invention, if the quality (e.g. CQI) reported by a certain MIMO user equipment is below a certain first threshold, then the node B will decide to switch said user equipment to E-VAM, and the precoding weights for transmission to said MIMO user equipments will be set to a fixed value (they will be "frozen"). Of course, the quality (e.g. CQI) reported by the MIMO user equipments is periodically determined and when the quality (e.g. CQI) reported by said certain MIMO user equipment is above a certain second threshold (which could be the same as the first threshold), then the node B will decide to switch said user equipment again to MIMO, so the MIMO precoding weights are not frozen anymore and they will be again changed (typically every TTI) for said certain MIMO user equipment as in a normal MIMO operation (that is, selected to optimize the transmission, for example, taking into account the precoding weight values reported by the MIMO user equipment).

Instead of CQI, other alternative parameters can be used to determine the quality received by the MIMO as CPICH (Control Pilot Channel) RSCP (Received signal code Power), CPICH Ec/No, NACK info etc.

In another embodiment, if the MIMO transmission is dual stream the CQI used to make the decision could be a combination (e.g. and addition) of the $CQI_1$ and $CQI_2$ reported by the user equipment for the first and second stream respectively.

In another, more simple, embodiment, the node B will decide to switch an user equipment to E-VAM whenever the MIMO transmission is single stream (as in medium or bad radio conditions the most adequate transmission mode is single stream).

In an exemplary embodiment, if the MIMO transmission of the MIMO user equipment which is switched to E-VAM is dual stream, it is changed to single stream (as if the weights are frozen the double stream transmission is not efficient). This change to single stream is usually made after the MIMO user equipment CQIs are taken into account by the E-VAM algorithm to optimize the additional phase offset.

Between the freezing of the PCI weights and the selection of the E-VAM additional phase offset, there may be a period where the throughput for the MIMO user equipment is not optimal (as the PCI weights are frozen and the E-VAM has no benefit in the MIMO users because the phase offset is selected without taking into account said MIMO user). To avoid that, in an exemplary embodiment, the phase scan for the selection of the E-VAM additional phase offset, is triggered each time a MIMO user equipment is switched to E-VAM.

From the user equipment point of view, this switch to E-VAM, should be transparent. In any case, the only consequence from the user equipment point of view is that, after said switch to E-VAM, there is only a single stream (one transport block) transmitted but in medium radio conditions the most adequate transmission mode is predominantly single stream (dual stream use in these scenarios could worsen performance due to increased BLER).

The fallback process proposed by the present invention may be done in a short timeframe (approximately 100 ms or even less) so it allows a significant time saving (compared to the user equipment re-configuration using RNC signaling).

As explained before, the E-VAM phase offset is selected in order to maximize the cell throughput. To do this, the phase offset to be applied for the cell may be selected as a function of the measured quality (cqi) reported (31) by certain user equipments and a given optimisation criterion (e.g. equation (1)). The MIMO user equipments measured quality are not usually taken into account for said selection (as for these user equipments the effect of the E-VAM is almost inappreciable). However, when a MIMO user equipment is switched to E-VAM, said MIMO user equipment should be taken into account for the E_VAM phase offset selection (as said phase offset will also affect to said MIMO user equipment). Hence in an embodiment of the present invention, when the node B decides to fallback a certain MIMO user equipment to E-VAM, the quality reported by said MIMO user equipment will be from now on monitored and taken into account when calculating the optimum E-VAM offset (e.g. in equation (1)).

As explained before, if there are several simultaneous active user equipments the E-VAM phase offset selected is a trade-off between these active user equipments allowing to reach higher capacity, i.e. said phase offset is selected taking into account the quality reported by the active user equipments of the cell.

For a high number of active user equipments the Node B may decide the user equipment to remain in MIMO mode which might remain more efficient as there is only one phase offset for all active user equipments (cell level parameter) making E-VAM less efficient at high load. Hence in an embodiment of the present invention, the fallback from MIMO to E-VAM is reversed (or not performed) when the numbers of active user equipments (e.g. HSDPA active user equipments) in the cell is above a certain threshold. So the fallback is made not only on the radio conditions but also on the numbers of active user equipments in the cell.

In an exemplary embodiment when a MIMO user equipment is switched to E-VAM, the threshold for the users (e.g. HSDPA users) to be considered active (and therefore to be taken into account in the E-VAM additional offset selection) is increased (so the number of users considered active will be reduced and the E-VAM phase offset selection will be more efficient).

In an exemplary embodiment, the present invention solution is implemented in the baseband unit (BBU) of a Node B or in logic in the Remote Radio Unit (RRU) of a Node B (or an analogous network entity such as an eNode B or BTS). The implementation of this solution in other networks node is also possible.

In an exemplary embodiment, the solution disclosed in the present invention is applied to active antennas with multiple transmission sub-modules (each one applying an E-VAM technique).

Summarizing, the present invention propose a simple, fast and efficient solution to improve the MIMO operation performance in medium or bad radio conditions, especially in 3G mobile networks, avoiding the problems presented by the current solutions, especially from a signaling point of view. The solution propose a fast fallback from MIMO to E-VAM without requiring signaling to RNC and without requiring any change to the 3GPP standards and being transparent to the MIMO UE.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of operating a transmission system of a base station in a mobile communication network, the method comprising the steps of:
   determining, by the base station, a signal quality received by a Multiple Input Multiple Output (MIMO) functionality user equipments (UEs), said base station serving a first group of mobile communication network UEs, the transmission system comprising a first transmission branch for transmitting a first radio signal by a first physical antenna and a second transmission branch for transmitting a second radio signal by a second physical antenna, where an additional phase offset is added to one of the transmission branches, said phase offset being calculated by taking into account the signal quality received by a sub-group of the UEs served by the base station; where for the UEs served by the base station using the MIMO functionality, said transmission system applies MIMO precoding weights before transmission, to the first and second radio signals, the value of said MIMO precoding weights being updated for each MIMO user equipment, every certain period of time, based on information reported by said MIMO UEs;
   when the signal quality received by one of said MIMO UEs is below a certain first threshold, switching from MIMO functionality to a Virtual Antenna Mapping technique by assigning a fixed value to the MIMO precoding weights for said MIMO UE such that the additional phase offset has an effect on said MIMO UE without changing the MIMO configuration of said MIMO UE; and
   maintaining the MIMO precoding weights in said fixed value until a certain first criteria is fulfilled such that for said MIMO UE the precoding weights are not updated every said certain period of time.

2. The method according to claim 1, where the transmission system additionally uses the Virtual Antenna Mapping technique to balance the power between the transmission branches.

3. The method according to claim 1 where said certain period of time is a Transmission Time Interval TTI, that is, the precoding weights are updated every TTI.

4. The method according to claim 1 wherein said first criteria is that the quality received by said MIMO user is above a certain second threshold.

5. The method according to claim 1 wherein said first criteria is to fulfil one of the following conditions: that the quality received by said MIMO user is above a certain second threshold or that the number of active HSDPA user equipments served by the base station is above a certain third threshold.

6. The method according to claim 1 where the quality received by an user is determined based on the channel quality indication (CQI) reported by said user.

7. The method according to claim 1 where the MIMO transmission is dual stream and the quality received by a MIMO user is determined based in the combination of the CQI reported by the MIMO user for the first stream and the CQI reported by the MIMO user for the second stream.

8. The method according to claim 1, comprising the additional step of:
   if a dual stream MIMO transmission is being transmitted to said MIMO user whose signal quality is below a first threshold, the MIMO transmission for said MIMO user is changed to single stream until the first criteria is fulfilled.

9. The method according to claim 1, the method comprising the additional step of:
   adding said MIMO user equipment whose signal quality is below a first threshold, to the sub-group of user equipments whose received signal quality is taken into account to calculate the additional phase offset and removing said MIMO user equipment from said sub-group when the first criteria is fulfilled.

10. The method according to claim 1, where the calculation of the additional phase offset comprises the following steps:

making a phase scan, sampling the phase range by given steps of 40 degrees and measuring, for each phase offset, the received quality of the sub-group of user equipments;

selecting the phase offset to be applied for the cell as a function of the measured quality and a given optimisation criterion; and applying the selected phase offset to one of the transmission chains.

11. The method according to claim 1, where base station is a node B and the mobile communication network is a 3G mobile communication network.

12. A computer program product comprising non-transitory computer readable media having stored thereon computer program code that, when executed by a processor is adapted to perform the method according to claim 1.

13. The method according to claim 1, further comprising: switching from the Virtual Antenna Mapping technique back to MIMO functionality when the certain first criteria is fulfilled such that for said MIMO UE the precoding weights are updated every said certain period of time.

14. A transmission system for use in a base station of a mobile communication network said base station serving a first group of mobile communication network user equipments, the transmission system comprising:

a first transmission branch for transmitting a first radio signal by a first physical antenna and a second transmission branch for transmitting a second radio signal by a second physical antenna;

a processor that instantiates in system memory:

a module that adds an additional phase offset to one of the transmission branches of one of the physical antennas, said additional phase offset being calculated taken into account the signal quality received by some of the user equipments served by the base station;

a module that weights, for the user equipments served by the base station using a Multiple Input Multiple Output MIMO functionality, called MIMO user equipments, weights before transmission said first and second radio signals by MIMO precoding weights, said MIMO precoding weights being updated for each MIMO user equipment, every certain period of time, based on information reported by said MIMO user equipment; and a scheduler module that determines the signal quality received by the MIMO user equipments and, when the signal quality received by one of said MIMO UEs is below a certain first threshold, switches from MIMO functionality to a Virtual Antenna Mapping technique by assigning a fixed value to the precoding weights for said MIMO UE such that the additional phase offset has an effect on said MIMO UE without changing the MIMO configuration of said MIMO UE, and maintains the MIMO precoding weights in said fixed value until a certain first criteria is fulfilled such that for said MIMO UE the precoding weights are not updated every said certain period of time.

15. The transmission system according to claim 14 where said transmission system additionally uses the Virtual Antenna Mapping technique to balance the power between the transmission branches.

16. A Node B comprising the transmission system according to claim 14.

17. The transmission system according to claim 14, wherein the scheduler module switches from the Virtual Antenna Mapping technique back to MIMO functionality when the certain first criteria is fulfilled such that for said MIMO UE the precoding weights are updated every said certain period of time.

* * * * *